United States Patent
Hsu et al.

(10) Patent No.: US 9,537,418 B2
(45) Date of Patent: Jan. 3, 2017

(54) POWER CONVERSION APPARATUS AND CONTROL CHIP THEREOF

(71) Applicants: Ta-Ching Hsu, Taipei (TW); Chung-Ming Leng, New Taipei (TW)

(72) Inventors: Ta-Ching Hsu, Taipei (TW); Chung-Ming Leng, New Taipei (TW)

(73) Assignee: NIKO SEMICONDUCTOR CO., LTD., New Taipei (TW)

( * ) Notice: Subject to any disclaimer, the term of this patent is extended or adjusted under 35 U.S.C. 154(b) by 85 days.

(21) Appl. No.: 14/509,053

(22) Filed: Oct. 8, 2014

(65) Prior Publication Data
US 2015/0180324 A1    Jun. 25, 2015

(30) Foreign Application Priority Data

Dec. 20, 2013    (TW) .............................. 102147597 A

(51) Int. Cl.
*H02M 1/088*    (2006.01)
*H02M 7/06*    (2006.01)
*H02M 1/32*    (2007.01)

(52) U.S. Cl.
CPC .............. *H02M 7/06* (2013.01); *H02M 1/088* (2013.01); *H02M 2001/322* (2013.01)

(58) Field of Classification Search
CPC .... H02M 7/04; H02M 2001/322; H02M 7/06; H02M 1/44; H02M 1/12; H02M 1/32; H02M 1/126; H02M 1/088; H02M 2001/0048; H02M 7/217
See application file for complete search history.

(56) References Cited

U.S. PATENT DOCUMENTS

| | | | |
|---|---|---|---|
| 8,406,023 B2 | 3/2013 | Tang | |
| 2011/0068751 A1* | 3/2011 | Lin | H02M 1/126 320/166 |
| 2011/0116203 A1* | 5/2011 | Chan | H02M 1/126 361/229 |
| 2011/0122668 A1* | 5/2011 | Lo | H02J 9/061 363/126 |
| 2012/0207505 A1* | 8/2012 | Kobayashi | H02M 1/32 399/88 |

(Continued)

FOREIGN PATENT DOCUMENTS

| | | |
|---|---|---|
| CN | 103081322 | 5/2013 |
| TW | 201112603 | 4/2011 |

(Continued)

*Primary Examiner* — Gustavo Rosario Benitez
(74) *Attorney, Agent, or Firm* — Jianq Chyun IP Office

(57) ABSTRACT

A power conversion apparatus is provided. The power conversion apparatus receives an AC input power by an input side and includes a capacitor, an AC-to-DC conversion unit and a discharge unit. The capacitor is connected with the input side. The AC-to-DC conversion unit is coupled to the input side, and configured to convert the AC input power after receiving the AC input power to generate a DC output power. The discharge unit is coupled to the capacitor and has at least two switch elements. The discharge unit enables the at least two switch elements when supply of the AC input power is interrupted, such that one of a first discharge path and a second discharge path formed by the at least two switch elements is taken to discharge or drain the energy stored in the capacitor.

7 Claims, 6 Drawing Sheets

(56) References Cited

U.S. PATENT DOCUMENTS

| | | | | |
|---|---|---|---|---|
| 2013/0027999 A1* | 1/2013 | Ptacek | ............... | H02M 1/126 363/126 |
| 2013/0049706 A1* | 2/2013 | Huang | ............... | H02M 1/32 320/166 |
| 2013/0278159 A1* | 10/2013 | Del Carmen, Jr. | | H05B 33/0809 315/200 R |
| 2014/0097822 A1* | 4/2014 | Chou | ............... | H02M 1/32 323/311 |

FOREIGN PATENT DOCUMENTS

| | | |
|---|---|---|
| TW | 201310840 | 3/2013 |
| TW | 201328147 | 7/2013 |

* cited by examiner

POWER CONVERSION APPARATUS AND CONTROL CHIP THEREOF

CROSS-REFERENCE TO RELATED APPLICATION

This application claims the priority benefit of Taiwan application serial no. 102147597, filed on Dec. 20, 2013. The entirety of the above-mentioned patent application is hereby incorporated by reference herein and made a part of this specification.

BACKGROUND

Technical Field

The invention relates to a power conversion technique, and particularly relates to a power conversion apparatus capable of opportunely discharging/draining electric energy stored in an X capacitor when supply of an alternating current input power is interrupted and a control chip thereof.

Related Art

Power conversion apparatuses are capable of converting an alternating current (AC) input power provided by a power company into a direct current (DC) output power. Therefore, the power conversion apparatuses are widely used/applied in electronic apparatuses such as computers, office automation equipment, industrial control equipment and communication equipment, etc.

Generally, an input stage of a conventional power conversion apparatus is equipped with an electromagnetic interference (EMI) filter to filter/suppress an EMI in the received AC input power. However, when supply of the AC input power received by the power conversion apparatus is interrupted, electric energy remained in an X-capacitor of the EMI filter probably results in a risk of electric shock when none discharge path exists. Therefore, based on security consideration, international safety standards have particular specifications: when the AC input power received by the power conversion apparatus is interrupted, the electric energy remained in the X-capacitor of the EMI filter equipped to the input stage of the power conversion apparatus has to drop to a safe voltage range within 1 second.

Therefore, a bleeder resistor is generally used to connect in parallel to two ends of the X-capacitor, and serves as a discharge path of the X-capacitor when supply of the AC input power received by the power conversion apparatus is interrupted. However, usage of the bleeder resistor inevitably causes a certain degree of power loss. Therefore, a power saving performance of the power conversion apparatus in a standby state is seriously influenced, which is not complied with an energy saving concept advocated by Energy star or other energy saving associations (such as CSA, DoE, EuP, etc.), or cannot satisfy a new standby power specification.

SUMMARY

The invention is directed to a power conversion apparatus capable of releasing/draining electric energy stored in a safety standard recognized capacitor (for example, an X capacitor) when supply of an alternating current (AC) input power is interrupted and a control chip thereof, and the adopted solution further has an extremely low power consumption performance, so as to effectively resolve the problem mentioned in the related art.

Other objects and advantages of the invention can be further illustrated by the technical features broadly embodied and described as follows.

An exemplary embodiment of the invention provides a power conversion apparatus. The power conversion apparatus receives an alternating current (AC) input power by an input side and includes a capacitor, an AC-to-DC conversion unit and a discharge unit. The capacitor is coupled to the input side. The AC-to-DC conversion unit is coupled to the input side, and is configured to convert the AC input power after receiving the AC input power to generate a direct current (DC) output power. The discharge unit is coupled to the capacitor and has at least two switch elements. The discharge unit enables the at least two switch elements when supply of the AC input power is interrupted, such that one of a first discharge path and a second discharge path formed by the at least two switch elements is taken to discharge or drain electric energy stored in the capacitor.

In an exemplary embodiment of the invention, the input side has a first input terminal and a second input terminal, and the at least two switch elements are composed of a first switch element and a second switch element. Moreover, the discharge unit includes a first bleeder resistor, a second bleeder resistor, the first switch element, the second switch element and a control circuit. A first end of the first bleeder resistor is coupled to the first input terminal. A first end of the second bleeder resistor is coupled to the second input terminal, a drain of the first switch element is coupled to a second end of the first bleeder resistor, a source of the first switch element is coupled to a fixed potential, and a gate of the first switch element receives a control signal. A drain of the second switch element is coupled to a second end of the second bleeder resistor, a source of the second switch element is coupled to the fixed potential, and a gate of the second switch element receives the control signal. The control circuit is coupled to the input side, and sends the control signal to control switching of the first switch element and the second switch element according to a state of the AC input power.

In an exemplary embodiment of the invention, the control circuit includes a first resistor, a first capacitor, a first diode, a second diode, a second capacitor, a second resistor and a Zener diode. A first end of the first resistor is coupled to the first input terminal, and a first end of the first capacitor is coupled to a second end of the first resistor. An anode of the first diode is coupled to a second end of the first capacitor, and a cathode of the first diode is coupled to the fixed potential. A cathode of the second diode is coupled to the anode of the first diode, and an anode of the second diode is coupled the gates of the first switch element and the second switch element. A first end of the second capacitor is coupled to the anode of the second diode, and a second end of the second capacitor is coupled to the fixed potential. The second resistor and the second capacitor are connected in parallel, and the Zener diode and the second resistor are connected in parallel. In this case, the first switch element, the second switch element, the second diode, the second capacitor, the second resistor and the Zener diode are packaged in a first control chip.

In an exemplary embodiment of the invention, the control circuit includes a first resistor, a first capacitor, a Zener diode, a diode, a second capacitor and a second resistor. A first end of the first resistor is coupled to the first input terminal, a first end of the first capacitor is coupled to a second end of the first resistor. An anode of the Zener diode is coupled to a second end of the first capacitor, and a cathode of the Zener diode is coupled to the fixed potential. A cathode of the diode is coupled to the anode of the Zener diode, and an anode of the diode is coupled to the gates of the first switch element and the second switch element. A first end of the second capacitor is coupled to the anode of the diode, and a second end of the second capacitor is coupled to the fixed potential. The second resistor and the second capacitor are connected in parallel. In this case, the first switch element, the second switch element, the diode, the second capacitor and the second resistor are packaged in a second control chip.

In an exemplary embodiment of the invention, the first switch element and the second switch element are respectively composed of an N-type depletion metal oxide semiconductor field effect transistor.

In an exemplary embodiment of the invention, the AC-to-DC conversion unit includes a full bridge rectifier, where a receiving side thereof is coupled to the input side of the power conversion apparatus for receiving the AC input power, and the AC-to-DC conversion unit further includes a buck capacitor, which is coupled to an output side of the full bridge rectifier to generate the DC output power.

An exemplary embodiment of the invention provides a control chip, which is adapted to a power conversion apparatus. The power conversion apparatus receives an alternating current (AC) input power by an input side, where the input side has a first input terminal and a second input terminal. The power conversion apparatus includes a capacitor coupled to the first input terminal and the second input terminal; a first bleeder resistor, having a first end coupled to the first input terminal; a second bleeder resistor, having a first end coupled to the second input terminal; a first resistor, having a first end coupled to the first input terminal; a first capacitor, having a first end coupled to a second end of the first resistor; and a first diode, having an anode coupled to a second end of the first capacitor and a cathode coupled to a fixed potential. The control chip includes a first switch element, having a drain coupled to a second end of the first bleeder resistor, and a source coupled to the fixed potential; a second switch element, having a drain coupled to a second end of the second bleeder resistor, and a source coupled to the fixed potential; a second diode, having a cathode coupled to the anode of the first diode, and an anode coupled to gates of the first switch element and the second switch element; a second capacitor, having a first end coupled to the anode of the second diode, and a second end coupled to the fixed potential; a second resistor connected in parallel to the second capacitor; and a Zener diode connected in parallel to the second resistor.

An exemplary embodiment of the invention provides a control chip, which is adapted to a power conversion apparatus. The power conversion apparatus receives an alternating current (AC) input power by an input side, where the input side has a first input terminal and a second input terminal. The power conversion apparatus includes a capacitor coupled to the first input terminal and the second input terminal; a first bleeder resistor, having a first end coupled to the first input terminal; a second bleeder resistor, having a first end coupled to the second input terminal; a first resistor, having a first end coupled to the first input terminal; a first capacitor, having a first end coupled to a second end of the first resistor; and a Zener diode, having an anode coupled to a second end of the first capacitor and a cathode coupled to a fixed potential. The control chip includes a first switch element, having a drain coupled to a second end of the first bleeder resistor, and a source coupled to the fixed potential; a second switch element, having a drain coupled to a second end of the second bleeder resistor, and a source coupled to the fixed potential; a diode, having a cathode coupled to the anode of the Zener diode, and an anode coupled to gates of the first switch element and the second switch element; a second capacitor, having a first end coupled to the anode of the diode, and a second end coupled to the fixed potential; and a second resistor connected in parallel to the second capacitor.

According to the above descriptions, the power conversion apparatus and the control chip provided by the invention can opportunely and quickly discharge/drain the energy stored in a safety standard recognized capacitor (for example, an X-capacitor) when supply of the AC input power is interrupted, and the adopted solution (i.e. a circuit implementation of the discharge unit) has an extremely low power consumption performance (due to all passive elements and no external bias supply), so as to effectively resolve the problem mentioned in the related art. Besides, based on the circuit implementation of the discharge unit, the X-capacitor can be flexibly selected to design the EMI filter equipped to the input stage of the power conversion apparatus, so as to optimise the differential mode EMI filtering and decrease the cost of an inductor implemented in the EMI filter (since a small inductor element is allowed to be used due to the buck X-capacitor).

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
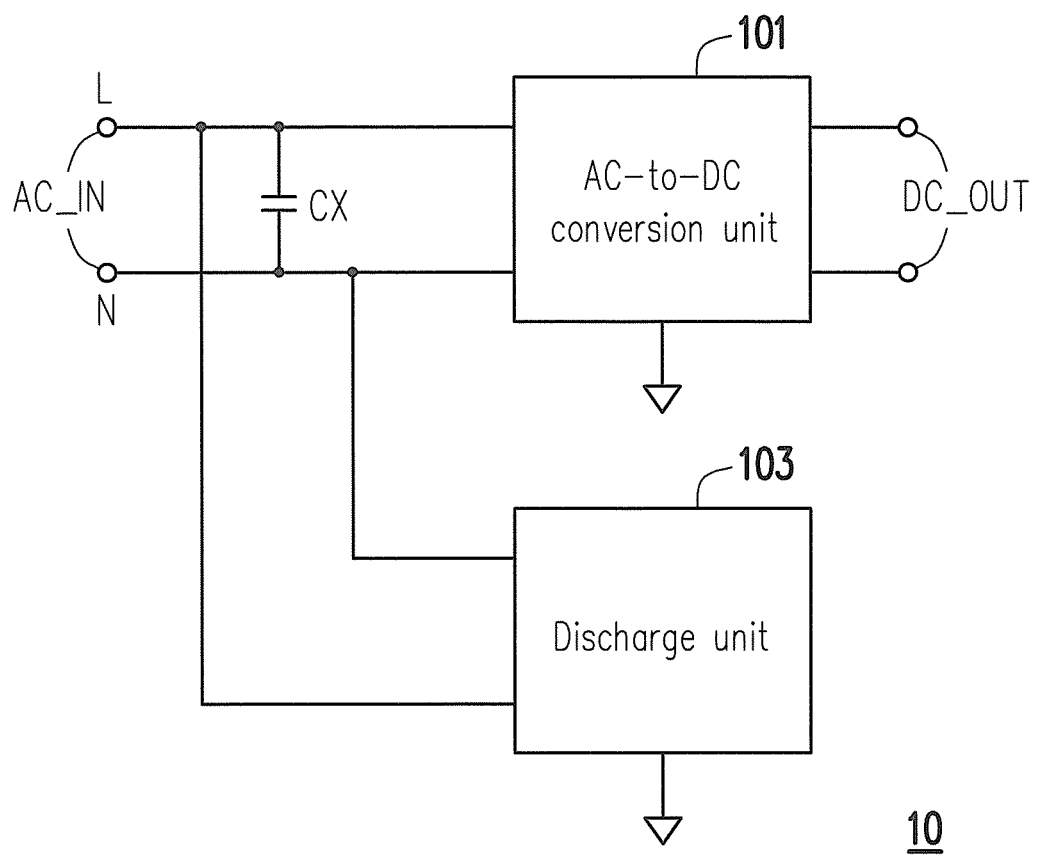
FIG. 1 is a schematic diagram of a power conversion apparatus 10 according to an exemplary embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
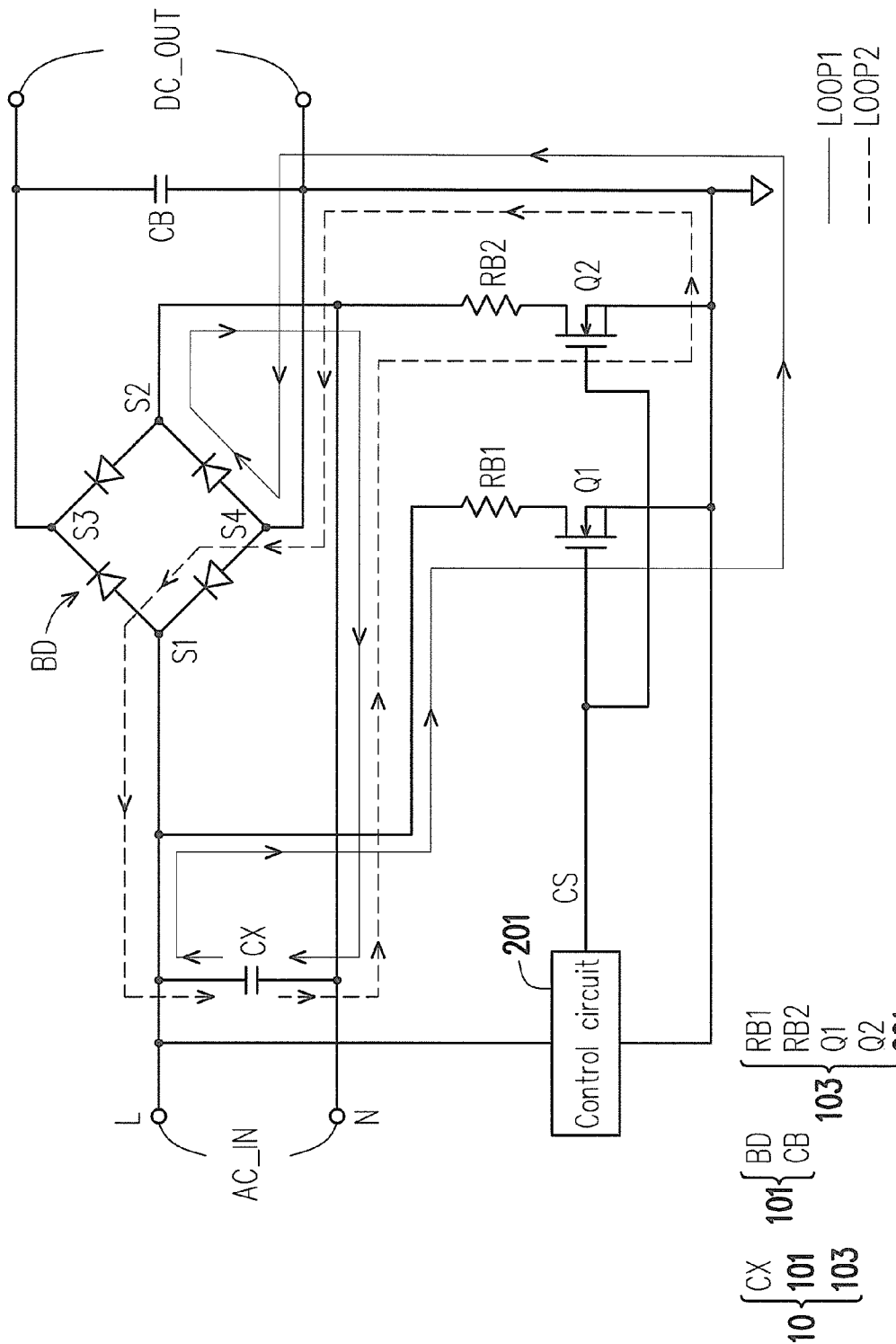
FIG. 2 is a schematic diagram of an implementation of the power conversion apparatus 10 of FIG. 1.

FIG. 1 is a schematic diagram of a power conversion apparatus 10 according to an exemplary embodiment of the invention, FIG. 2 is a schematic diagram of an implementation of the power conversion apparatus 10 of FIG. 1. Referring to FIG. 1 and FIG. 2, the power conversion apparatus 10 at least includes a capacitor CX (for example, an X-capacitor, and the capacitor CX is referred to as X-capacitor CX hereinafter), an alternating current (AC)-to-direct current (DC) conversion unit 101 and a discharge unit 103. In the present exemplary embodiment, the X-capacitor CX is coupled to an input side of the power conversion apparatus 10, where the input side has a first input terminal (for example, an L-terminal) and a second input terminal (for example, an N-terminal). However, in other exemplary embodiment, the first input terminal is changed to the N-terminal, and the second input terminal is changed to the L-terminal, which is determined according to an actual design requirement. In the following descriptions, the first input terminal is assumed to be the L-terminal and the second input terminal is the N-terminal. The AC-to-DC conversion unit 101 is coupled to the input side (the L-terminal and the N-terminal) of the power conversion apparatus 10, and is configured to receive an AC input power AC_IN and convert (i.e. perform an AC-to-DC conversion on) the received AC input power AC_IN to generate a direct current (DC) output power DC_OUT.

To be specific, as shown in FIG. 2, the AC-to-DC conversion unit 101 may include a full bridge rectifier BD and a buck capacitor CB. An receiving side (S1, S2) of the full bridge rectifier BD is coupled to the input side (the L-terminal, the N-terminal) for receiving the AC input power AC_IN, so as to implement/perform a full-wave rectifying action. Moreover, the buck capacitor CB is coupled to an output side (S3, S4) of the full bridge rectifier BD to implement/perform a filtering operation, so as to generate the DC output power DC_OUT. It should be noticed that the generated DC output power DC_OUT can be a relatively high DC voltage (for example, 380V-400V, though the invention is not limited thereto), which can be converted into a relatively low and stable DC voltage and provided to a load (for example, any type of electronic apparatus) for usage by another power conversion structure having a pulse width modulation (PWM)-based control mechanism and an isolation characteristic.

On the other hand, the discharge unit 103 is coupled to the X-capacitor CX and has at least two switch elements (for example, Q1 and Q2). In the present exemplary embodiment, when supply of the AC input power AC_IN is interrupted, the discharge unit 103 enables/activates the at least two switch elements Q1 and Q2, such that one of a first discharge path LOOP1 (i.e. a path shown by solid line arrows) and a second discharge path LOOP2 (i.e. a path shown by dot line arrows) formed by the at least two switch elements Q1 and Q2 is taken to discharge/drain energy stored in the X-capacitor CX (in other words, the discharge unit 103 is enabled/activated when supply of the AC input power AC_IN is interrupted). Conversely, the discharge unit 103 can disable/inactivate the two switch elements Q1 and Q2 when the AC-to-DC conversion unit 101 receives the AC input power AC_IN, so as to avoid power loss (in other words, the discharge unit 103 is disabled/inactivated when the AC-to-DC conversion unit 101 receives the AC input power AC_IN).

To be specific, as shown in FIG. 2, the discharge unit 103 may include bleeder resistors RB1, RB2, the switch elements Q1, Q2 and a control circuit 201. A first end of the bleeder resistor RB1 is coupled to a first end of the X-capacitor CX and the L-terminal of the input side. A first end of the bleeder resistor RB2 is coupled to a second end of the X-capacitor CX and the N-terminal of the input side.

A drain of the switch element Q1 is coupled to a second end of the bleeder resistor RB1, a source of the switch element Q1 is coupled to a fixed potential (for example, a ground potential shown in FIG. 2, though the invention is not limited thereto), and a gate of the switch element Q1 receives a control signal CS from the control circuit 201. A drain of the switch element Q2 is coupled to a second end of the bleeder resistor RB2, a source of the switch element Q2 is coupled to the ground potential, and a gate of the switch element Q2 also receives the control signal CS from the control circuit 201.

The control circuit 201 is coupled to the input side (the L-terminal, the N-terminal) and the switch elements Q1 and Q2, and sends the control signal CS to control switching (i.e. turning on/off) of the switch elements Q1 and Q2 according to a state (for example, normal or interrupted) of the AC input power AC_IN. In the present exemplary embodiment, the switch elements Q1 and Q2 can be composed of N-type depletion metal oxide semiconductor field effect transistors (MOSFETs), though the invention is not limited thereto. Under such condition, when supply of the AC input power AC_IN is interrupted, the switch elements Q1 and Q2 are turned on in response to the (0V) control signal CS, and the discharge unit 103 is enabled to discharge the electric energy stored in the X-capacitor CX. Moreover, when the AC-to-DC conversion unit 101 receives the AC input power AC_IN, the switch elements Q1 and Q2 are turned off in response to the (negative voltage) control signal CS, and the discharge unit 103 is disabled, and ideally consumes no power (0 W), or consumes extremely low power (1-2 W).

Figure 3A:
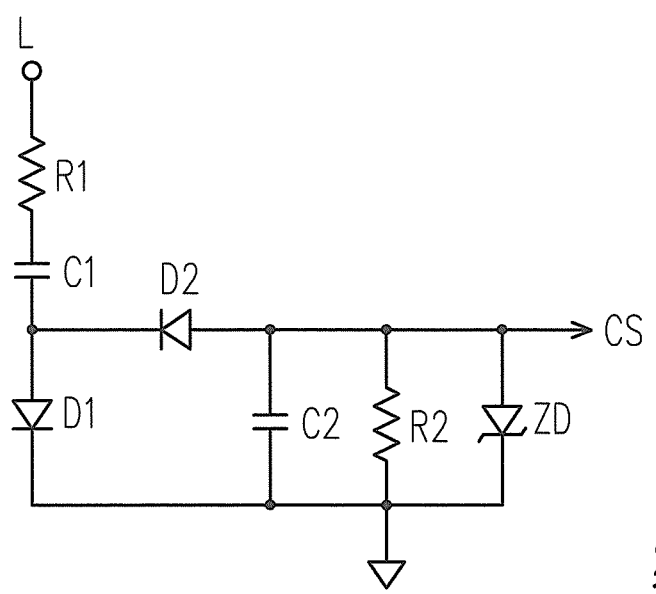
FIG. 3A is a schematic diagram of an implementation of a control circuit 201 according to an exemplary embodiment of the invention.
Figure 3B:
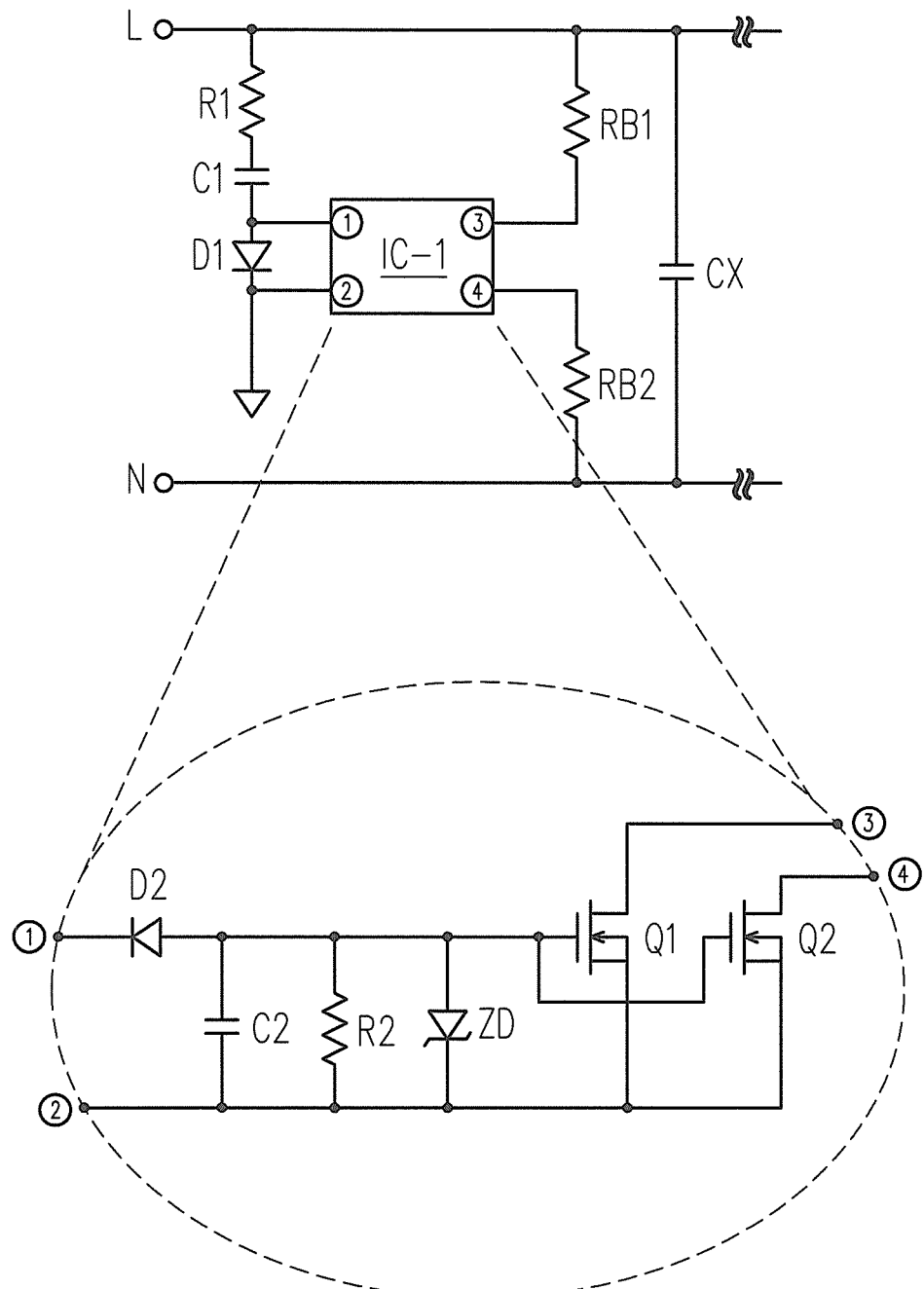
FIG. 3B is a partial equivalent schematic diagram of circuit integration according to an exemplary embodiment of the invention.

To be specific, FIG. 3A is a schematic diagram of an implementation of the control circuit 201 according to an exemplary embodiment of the invention. Referring to FIG. 3A, the control circuit 201 shown in FIG. 3A may include resistors R1, R2, capacitors C1, C2, diodes D1, D2, and a Zener diode ZD. A first end of the resistor R1 is coupled to the L-terminal of the input side of the power conversion apparatus 10, and a first end of the capacitor C1 is coupled to a second end of the resistor R1. An anode of the diode D1 is coupled to a second end of the capacitor C1, and a cathode of the diode D1 is coupled to the ground potential. A cathode of the diode D2 is coupled to the anode of the diode D1, and an anode of the diode D2 is coupled the gates of the switch elements Q1 and Q2 to generate the control signal CS. A first end of the capacitor C2 is coupled to the anode of the diode D2, and a second end of the capacitor C2 is coupled to the ground potential. The resistor R2 and the capacitor C2 are connected in parallel, and the Zener diode ZD and the resistor R2 are connected in parallel. In an actual application, the switch elements Q1 and Q2, the diode D2, the capacitor C2, the resistor R2 and the Zener diode ZD can be integrated and packaged in an integrated circuit (a first control chip IC-1 shown in FIG. 3B) having 4 pins (though the invention is not limited thereto), where the diodes D1, D2, the capacitor C2, the resistor R2 and the Zener diode ZD construct a negative voltage clamping circuit, which is capable of controlling switching of the switch elements Q1 and Q2 composed of N-type depletion metal oxide semiconductor field effect transistors (MOSFETs), so as to achieve an effective discharge control.

Figure 4A:
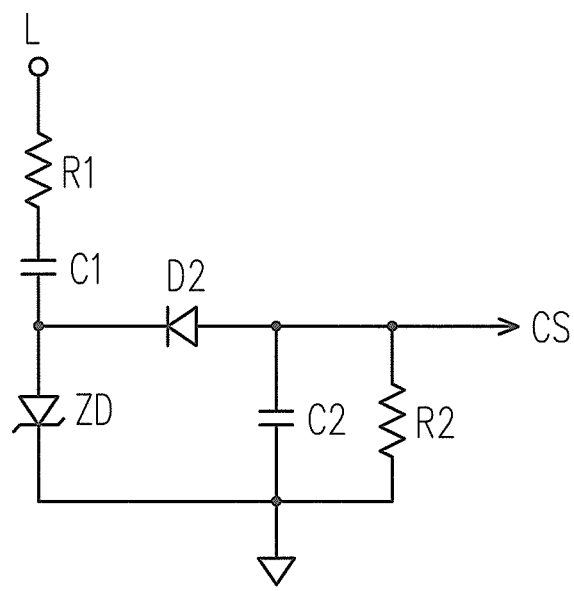
FIG. 4A is a schematic diagram of an implementation of the control circuit 201 according to another exemplary embodiment of the invention.
Figure 4B:
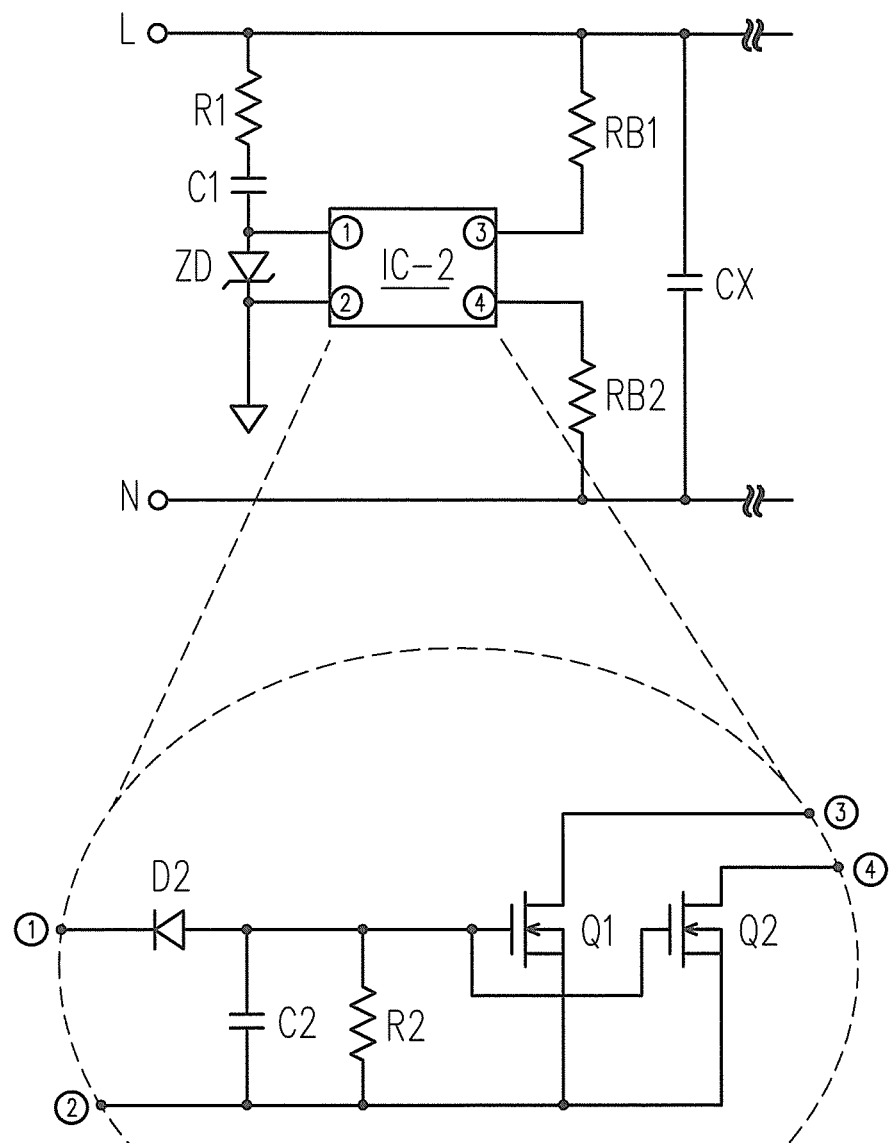
FIG. 4B is a partial equivalent schematic diagram of circuit integration according to another exemplary embodiment of the invention.

On the other hand, FIG. 4A is a schematic diagram of an implementation of a control circuit 201 according to another exemplary embodiment of the invention. Referring to FIG. 4A, the control circuit 201 may include resistors R1, R2, capacitors C1, C2, a Zener diode ZD, and a diode D2. A first end of the resistor R1 is coupled to the L-terminal of the input side of the power conversion apparatus 10, and a first end of the capacitor C1 is coupled to a second end of the resistor R1. An anode of the Zener diode ZD is coupled to a second end of the capacitor C1, and a cathode of the Zener diode ZD is coupled to the ground potential. A cathode of the diode D2 is coupled to the anode of the Zener diode ZD, and an anode of the diode D2 is coupled to the gates of the switch elements Q1 and Q2 to generate the control signals CS. A first end of the capacitor C2 is coupled to the anode of the diode D2, and a second end of the capacitor C2 is coupled to the ground potential. The resistor R2 and the capacitor C2 are connected in parallel. In an actual application, the switch elements Q1 and Q2, the diode D2, the capacitor C2, the resistor R2 can be integrated and packaged in an integrated circuit (a second control chip IC-2 shown in FIG. 4B) having 4 pins (though the invention is not limited thereto), where the Zener diode ZD, the diode D2, the capacitor C2 and the resistor R2 also construct a negative voltage clamping circuit, which is capable of controlling switching of the switch elements Q1 and Q2 composed of N-type depletion MOSFETs, so as to achieve an effective discharge control.

According to the above descriptions, when the AC-to-DC conversion unit 101 receives the AC input power AC_IN, regardless of the control circuit 201 of FIG. 3A or FIG. 4A, the internal negative voltage clamping circuit generates a negative voltage control signal CS. In this way, based on a device characteristic of the N-type depletion MOSFETs, the switch elements Q1 and Q2 are turned off in response to the negative voltage control signal CS, so as to disable the discharge unit 103. Under such condition, the bleeder resistors RB1 and RB2 do not cause any power loss due to lack of a complete loop.

On the other hand, when supply of the AC input power AC_IN is interrupted, regardless of the control circuit 201 of FIG. 3A or FIG. 4A, the control signal CS generated by the internal negative voltage clamping circuit is decreased as the AC input power AC_IN disappears, and charges of the capacitor C2 are quickly discharged through the resistor R2, so as to generate the 0V control signal CS. In this way, the switch elements Q1 and Q2 are turned on in response to the 0V control signal CS, so as to enable the discharge unit 103, and the turned on switch elements Q1 and Q2 and the bleeder resistors RB1 and RB2 construct complete discharge paths (LOOP1, LOOP2) to drain the electric energy stored in the X-capacitor CX (i.e. to discharge the charges stored in the X-capacitor CX to decrease the voltage at two ends of the X-capacitor CX).

To be specific, when supply of the AC input power AC_IN is interrupted, if the voltage at the L-terminal of the input side of the power conversion apparatus 10 is positive, the discharge unit 103 provides the first discharge path LOOP1 corresponding to the switch element Q1 to drain the electric energy stored in the X-capacitor CX, and decrease the voltage of the X-capacitor CX to a save voltage range within 1 second (for example, the voltage is decreased to 37% of an original level, though the invention is not limited thereto); conversely, when supply of the AC input power AC_IN is interrupted, if the voltage at the N-terminal of the input side of the power conversion apparatus 10 is positive, the discharge unit 103 provides the second discharge path LOOP2 corresponding to the switch element Q2 to drain the electric energy stored in the X-capacitor CX, and decrease the voltage of the X-capacitor CX to the save voltage range within 1 second (for example, the voltage is decreased to 37% of the original level, though the invention is not limited thereto).

In summary, the power conversion apparatus 10 and the control chip (IC-1, IC-2) provided by the invention can opportunely and quickly discharge/drain the energy stored in the X-capacitor CX when supply of the AC input power AC_IN is interrupted (note: the voltage of the X-capacitor CX can be decreased to the safe voltage range within 1 second as long as proper external bleeder resistors RB1 and RB2 are selected), and the adopted solution (i.e. a circuit implementation of the discharge unit 103) has an extremely low power consumption performance (due to all passive elements and no external bias supply, for example, smaller than 1-2 mW), so as to effectively resolve the problem mentioned in the related art. Besides, based on the circuit implementation of the discharge unit 103, the X-capacitor CX can be flexibly selected to design the EMI filter equipped to the input stage of the power conversion apparatus 10, so as to optimise the differential mode EMI filtering and decrease the cost of an inductor implemented in the EMI filter (since a small inductor element is allowed to be used due to the buck X-capacitor).

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A power conversion apparatus, receiving an alternating current (AC) input power by an input side, and comprising:
    a capacitor, coupled to the input side;
    an AC-to-direct current (DC) conversion unit, coupled to the input side, and configured to convert the AC input power after receiving the AC input power to generate a DC output power; and
    a discharge unit, coupled to the capacitor and having at least two switch elements, wherein the discharge unit enables the at least two switch elements when supply of the AC input power is interrupted, such that one of a first discharge path and a second discharge path formed by the at least two switch elements is taken to discharge or drain electric energy stored in the capacitor,
    wherein the input side has a first input terminal and a second input terminal, the at least two switch elements are composed of a first switch element and a second switch element, and the discharge unit comprises:
        a control circuit, coupled to the input side, and sending the control signal to control switching of the first switch element and the second switch element according to a state of the AC input power, wherein the control circuit comprises:
            a first resistor, having a first end coupled to the first input terminal;
            a first capacitor, having a first end coupled to a second end of the first resistor;
            a Zener diode, having an anode directly coupled to a second end of the first capacitor, and a cathode coupled to the fixed potential;
            a diode, having a cathode directly coupled to the anode of the Zener diode, and an anode coupled to the gates of the first switch element and the second switch element;
            a second capacitor, having a first end coupled to the anode of the diode, and a second end coupled to the fixed potential; and
            a second resistor, connected in parallel with the second capacitor.

2. The power conversion apparatus as claimed in claim 1, wherein the discharge unit further comprises:
    a first bleeder resistor, having a first end coupled to the first input terminal;
    a second bleeder resistor, having a first end coupled to the second input terminal;

the first switch element, having a drain coupled to a second end of the first bleeder resistor, a source coupled to a fixed potential, and a gate receiving a control signal; and the second switch element, having a drain coupled to a second end of the second bleeder resistor, a source coupled to the fixed potential, and a gate receiving the control signal.

3. The power conversion apparatus as claimed in claim 1, wherein the first switch element, the second switch element, the diode, the second capacitor and the second resistor are packaged in a control chip.

4. The power conversion apparatus as claimed in claim 1, wherein each of the first switch element and the second switch element is composed of an N-type depletion metal oxide semiconductor field effect transistor.

5. The power conversion apparatus as claimed in claim 1, wherein the AC-to-DC conversion unit comprises:

a full bridge rectifier, having a receiving side coupled to the input side for receiving the AC input power; and a buck capacitor, coupled to an output side of the full bridge rectifier to generate the DC output power.

6. A control chip, adapted to a power conversion apparatus, wherein the power conversion apparatus receives an alternating current (AC) input power by an input side, the input side has a first input terminal and a second input terminal, the power conversion apparatus comprises a capacitor coupled to the first input terminal and the second input terminal; a first bleeder resistor, having a first end coupled to the first input terminal; a second bleeder resistor, having a first end coupled to the second input terminal; a first resistor, having a first end coupled to the first input terminal; a first capacitor, having a first end coupled to a second end of the first resistor; and a Zener diode, having an anode directly coupled to a second end of the first capacitor and a cathode coupled to a fixed potential, the control chip comprising:

a first switch element, having a drain coupled to a second end of the first bleeder resistor, and a source coupled to the fixed potential;

a second switch element, having a drain coupled to a second end of the second bleeder resistor, and a source coupled to the fixed potential;

a diode, having a cathode directly coupled to the anode of the Zener diode, and an anode coupled to gates of the first switch element and the second switch element;

a second capacitor, having a first end coupled to the anode of the diode, and a second end coupled to the fixed potential; and a second resistor, connected in parallel with the second capacitor.

7. The control chip as claimed in claim 6, wherein each of the first switch element and the second switch element is composed of an N-type depletion metal oxide semiconductor field effect transistor.

* * * * *